(12) United States Patent
Ji (10) Patent No.: US 9,138,798 B2
(45) Date of Patent: Sep. 22, 2015

(54) BAGUETTE TRAY AND METHOD FOR MANUFACTURING THE SAME

(76) Inventor: Jong-Min Ji, Pocheon-si (KR)

( * ) Notice: Subject to any disclaimer, the term of this patent is extended or adjusted under 35 U.S.C. 154(b) by 633 days.

(21) Appl. No.: 13/386,903

(22) PCT Filed: Jul. 23, 2010

(86) PCT No.: PCT/KR2010/004855
§ 371 (c)(1),
(2), (4) Date: Jan. 24, 2012

(87) PCT Pub. No.: WO2011/013952
PCT Pub. Date: Feb. 3, 2011

(65) Prior Publication Data
US 2012/0118174 A1    May 17, 2012

(30) Foreign Application Priority Data
Jul. 27, 2009 (KR) .................. 10-2009-0069167
Jul. 19, 2010 (KR) .................. 10-2010-0069628

(51) Int. Cl.
*A22C 7/00* (2006.01)
*B21D 35/00* (2006.01)
*A21B 3/15* (2006.01)
*B21D 13/02* (2006.01)
*B21D 53/00* (2006.01)

(52) U.S. Cl.
CPC . *B21D 35/00* (2013.01); *A21B 3/15* (2013.01); *B21D 13/02* (2013.01); *B21D 53/00* (2013.01)

(58) Field of Classification Search
CPC .......... A21B 3/15; B21D 13/02; B21D 35/00; B21D 53/00
USPC ........... 99/324, 426, 432, 433, 439, 428, 430, 99/441, 448, 537; 249/117, 119
See application file for complete search history.

(56) References Cited

U.S. PATENT DOCUMENTS

| 5,232,609 A * | 8/1993 | Badinier et al. ............. 249/102 |
| 2005/0204932 A1* | 9/2005 | Tingley .......................... 99/445 |

FOREIGN PATENT DOCUMENTS

| JP | 11-290216 | 10/1999 |
| JP | 2003-235438 | 8/2003 |
| KR | 10-2000-0060000 | 10/2000 |
| KR | 20-0392008 | 8/2005 |

OTHER PUBLICATIONS

International Search Report for PCT/KR2010/004855 Mailed on Feb. 24, 2011.

* cited by examiner

*Primary Examiner* — Dana Ross
*Assistant Examiner* — Joseph Iskra
(74) *Attorney, Agent, or Firm* — Andrus Intellectual Property Law, LLP (57) ABSTRACT

The present invention relates to a baguette tray used in baking baguettes and to a method for manufacturing the same. More specifically, the invention relates to a baguette tray and a method for manufacturing the same, the baguette tray comprising: a body; a pair of first side surface parts which are bent and extend from the left and right sides of the body and are opposite to each other; and a pair of second side surface parts which are bent and extend from the front and rear sides of the body and are bent and extend from one side of the pair of first side surface parts, wherein the body includes a plurality of accommodation parts which are formed in parallel to the first side surface parts for accommodating flour dough, and a boundary part formed between the accommodation parts. The duration for manufacturing the baguette tray can be shortened, and the loss of material for manufacturing the baguette tray can be reduced. In addition, the baguette tray is convenient to use, can prevent accidental injuries during use, and has improved durability.

4 Claims, 13 Drawing Sheets

(a) BEFORE PRESSING (b) AFTER PRESSING

Fig. 8

(a) BEFORE PRESSING (b) AFTER PRESSING

Fig. 9

(a) BEFORE PRESSING (b) AFTER PRESSING

Fig. 10

(a) BEFORE PRESSING (b) AFTER PRESSING

Fig. 11

(a) BEFORE PRESSING (b) AFTER PRESSING

BAGUETTE TRAY AND METHOD FOR MANUFACTURING THE SAME

RELATED APPLICATIONS

This application is a 371 application of International Application No. PCT/KR2010/004855, filed Jul. 23, 2010, which in turn claims priority from Korean Patent Application Nos. 10-2010-0069628, filed Jul. 19, 2010, and 10-2009-0069167, filed Jul. 27, 2009, each of which is incorporated herein by reference in its entirety.

TECHNICAL FIELD

The present invention relates to a baguette tray used to make baguettes and a method of manufacturing the baguette tray, and particularly, to a baguette tray including a body, a pair of first sides bending and extending from the left and right sides of the body to be opposite to each other, and a pair of second sides bending and extending from the front and rear of the body and bending and extending from a side of each of the pair of first sides, in which the body includes a plurality of receiving portions formed in parallel with the first sides to receive flour dough and boundaries formed between the receiving portions, such that it is possible to easily manufacture the baguettes, reduce the loss of time and materials used for manufacturing the baguette tray, provide convenience in use and prevent a safety accident, and improve durability, and a method of manufacturing the baguette tray.

BACKGROUND ART

A baguette tray is a frame used for making baguettes, which are made by placing flour dough for the baguette on the baguette tray and putting the baguette tray into an oven.

Figure 1:
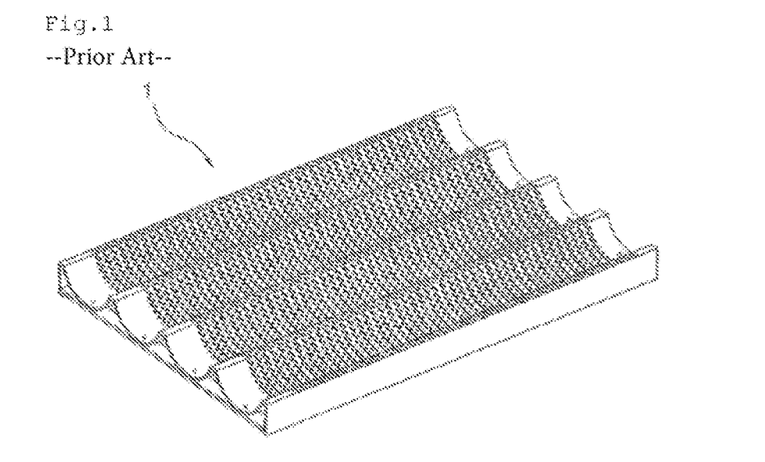
FIG. 1 is a perspective view of a baguette tray of the related art.
Figure 2:
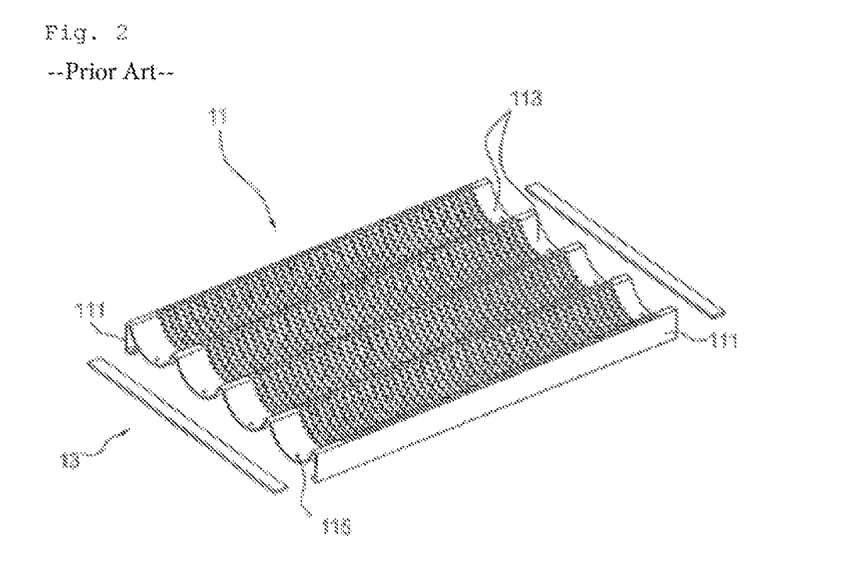
FIG. 2 is an exploded perspective view of the baguette tray of the related art.

FIG. 1 is a perspective view of a baguette tray of the related art and FIG. 2 is an exploded perspective view of the baguette tray of the related art, and the baguette tray of the related art will be described with reference to FIGS. 1 and 2.

A baguette tray 1 of the related art includes a body 11 where flour dough is placed and flat plates 13 disposed on the bottom of the body 11 to prevent deformation of the body 11, in which the body 11 has supports 111 formed by bending both opposite sides of a metal plate with a plurality of holes and a plurality of grooves 113 recessed down in parallel to the supports 111 to receive the flour dough. The baguette tray 1 of the related art is manufactured by placing the flat plates 13 on the bottom of the body 11 and spot-welding the flat plates 13, the supports 111, and the grooves 113.

However, since the baguette tray of the related art is manually joined by spot welding after preparing each of the body 11 and the flat plates 13, it takes a lot of labor and time to manufacture the tray and the operational efficiency is low, such that it is difficult to manufacture a baguette tray with a uniform quality. In particular, a relatively large amount of material loss may occur in preparing the body 11 and the flat plates 13, spot-welding equipment is additionally necessary for the spot-welding, and an additional process of forming the holes 115 through the grooves 113 is needed, such that it is economically inefficient.

Further, since the body 11 and the flat plates 13 of the baguette tray of the related art are separately provided and welded, the edges of the body 11 and the flat plates 13 are sharp, such that it is inconvenient to make baguettes or clean the baguette tray and a safety accident may occur.

Accordingly, the need for a baguette tray that can provide convenience and safety for use and has economical and uniform quality and a method of manufacturing the baguette tray has been increased.

DISCLOSURE

Technical Problem

The present invention has been contrived to solve the problems and an object of the present invention is to provide a baguette tray that makes it possible to easily make baguettes and a method of manufacturing the baguette tray.

Another object of the present invention is to provide a baguette tray that can be molded by pressing with a mold to reduce the loss of time and materials for the manufacture, and a method of manufacturing the baguette tray.

Yet another object of the present invention is to provide a baguette tray of which the edges where two or more of a body, a first side, and a second side are joint are rounded not to be sharp in order to provide convenience in use and prevent a safety accident, and a method of manufacturing the baguette tray.

Still another object of the present invention is to provide a baguette tray having improved durability by forming a protrusion at the joint of boundaries and a second side and a protrusion at an end of a receiving portion to prevent deformation of a body, and a method of manufacturing the baguette tray.

Still yet another object of the present invention is to provide a baguette tray that can be easily held and provides convenience and safety in use by forming curled portions at the ends of the first side and the second side, and a method of manufacturing the baguette tray.

Technical Solution

In order to achieve the objects of the present invention, a baguette tray and a method of manufacturing the baguette tray include the following configurations.

According to an embodiment of the present invention, a baguette tray according to the present invention includes: a body; a pair of first sides bending and extending from the left and right sides of the body to be opposite to each other; and a pair of second sides bending and extending from the front and rear of the body and bending and extending from a side of each of the pair of first sides, in which the body includes a plurality of receiving portions formed in parallel with the first sides to receive flour dough and boundaries formed between the receiving portions, and the body, the first sides, and the second sides are integrally formed by pressing.

According to another embodiment of the present invention, the baguette tray according to the present invention further includes protrusions that protrude outward from the inside at the joints of the boundaries and the second sides, in which the receiving portion further includes a protrusion bending and protruding upward from an end of the receiving portion to be connected to the second side.

According to another embodiment of the present invention, in the baguette tray according to the present invention, the edge of the joint of two or more of the body, the first side, and the second side is rounded.

According to another embodiment of the present invention, in the baguette tray according to the present invention, the first side and the second side have curled portions formed by curling the ends of the first side and the second side inward from the outside.

According to another embodiment of the present invention, a method of manufacturing a baguette tray according to the present invention includes: drawing that forms a body, first sides, and second sides by pressing a metal plate; trimming that cuts the ends of the pressed first sides and second sides with a predetermined length; flattening that flattens the first sides and the second sides of which the ends are cut with a predetermined length; and bending that bends inward the ends of the flattened first sides and second sides.

According to another embodiment of the present invention, in the method of manufacturing a baguette tray according to the present invention, the flattening includes: flange-processing that unbends the bending portions to be aligned with the first sides and the second sides and removes wrinkles and concavities and convexities on the first sides; and re-striking that forms a protrusion by pushing a recession formed at the joint of the second side and the boundary outward from the inside.

According to another embodiment of the present invention, the method of manufacturing a baguette tray according to the present invention further includes curling that forms curled portions by circularly curling the ends of the first side and the second side which are bent inward.

According to another embodiment of the present invention, in the method of manufacturing a baguette tray according to the present invention, in the drawing, a body, a pair of first sides bending and extending from the left and right sides of the body to be opposite to each other, and a pair of second sides bending and extending from the front and rear of the body and bending and extending from a side of each of the pair of first sides to be opposite to each other, are formed, a plurality of receiving portions formed in parallel with the first sides to receive flour dough and boundaries formed between the receiving portions are formed in the body, boundaries are formed between the receiving portions, and bending portions that are bent outward from the inside are formed at the ends of the first side and the second side.

According to another embodiment of the present invention, in the method of manufacturing a baguette tray according to the present invention, the trimming, the flattening, and the bending are performed by using a mold.

Advantageous Effects

The present invention can achieve the following effects from the embodiments described above and the configuration, combination, and use relationship, which will be described below.

The present invention has an effect that it is possible to easily make baguettes.

Further, the present invention has an effect that the baguette tray can be molded by pressing with a mold, thereby making it possible to reduce the loss of time and materials used for manufacturing.

Further, the present invention has an effect that since the edge of the joint of two or more of the body, the first side, and the second side is rounded, there is no sharp portion, such that it is possible to provide convenience in use and prevent a safety accident.

Further, the present invention has an effect that since the protrusion is formed at the joint of the boundary and the second side and the protrusion is formed at the end of the receiving portion, it is possible to prevent deformation of the body and improve durability.

Further, the present invention has an effect that since the curled portions are formed at the ends of the first side and the second side, it is possible to easily hold the baguette tray and provide convenience and safety in use.

BEST MODE

Hereinafter, a baguette tray according to the present invention and a method of manufacturing the baguette tray will be described in detail with reference to the accompanying drawings. It should be noted that the same components are given the same reference numerals anywhere as possible in the drawings. Further, the detailed description of known functions and configurations that may make the purpose of the present invention unnecessarily ambiguous will be omitted. It is assumed that all of the terminologies used herein have the same meanings as those of common terminologies that those skilled in the art understand, unless otherwise defined, and the terminologies follow the meanings defined herein, if different.

Figure 3:
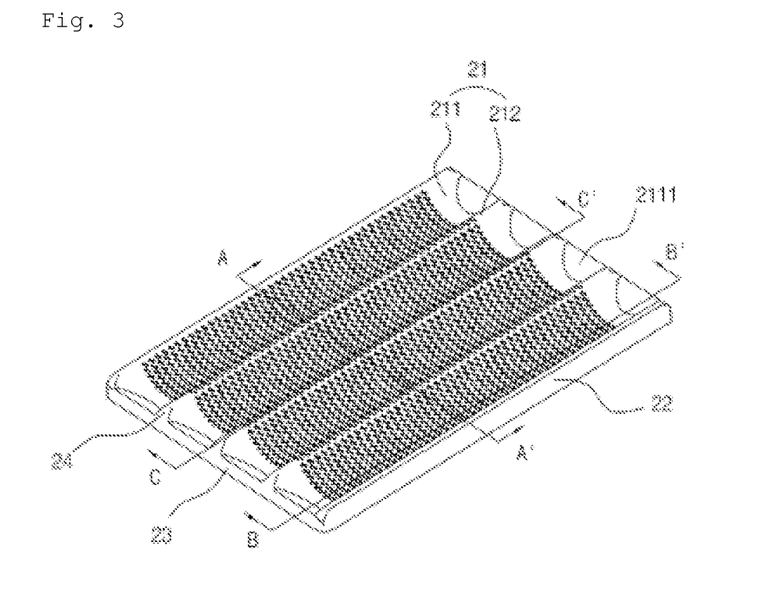
FIG. 3 is a perspective view showing the upper portion of a baguette tray according to an embodiment of the present invention.
Figure 4:
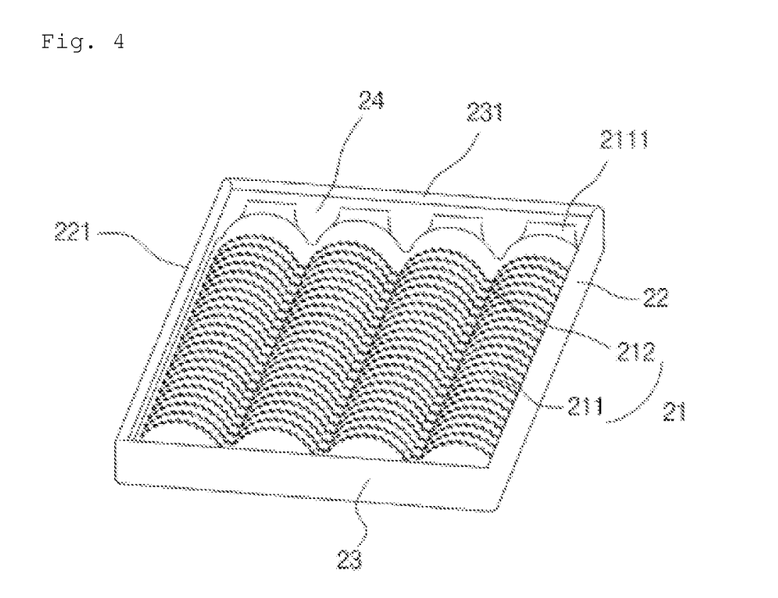
FIG. 4 is a perspective view showing the lower portion of the baguette tray according to an embodiment of the present invention.
Figure 5:
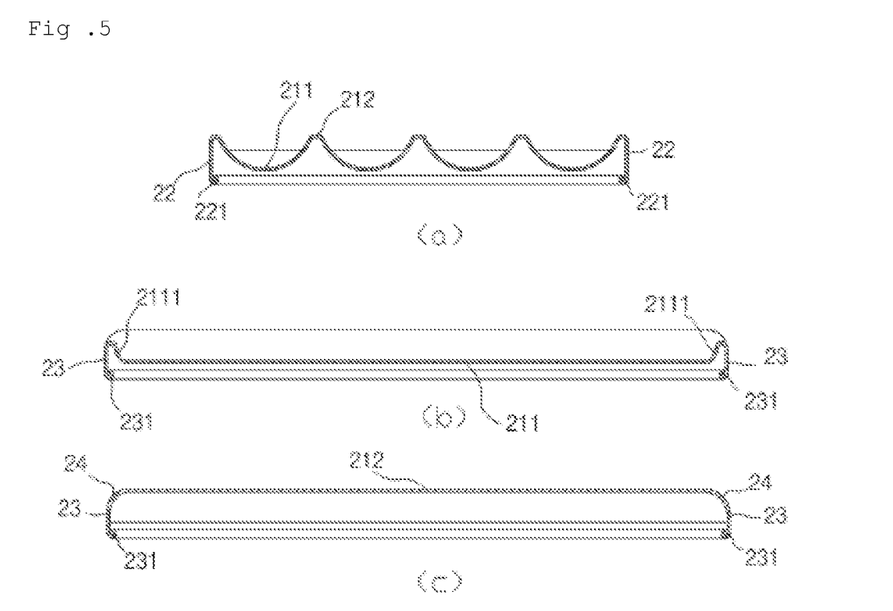
FIG. 5 is a cross-sectional view taken along lines (a) A-A', (b) B-B', and (c) C-C' of FIG. 3, respectively.

FIG. 3 is a perspective view showing the upper portion of a baguette tray according to an embodiment of the present invention, FIG. 4 is a perspective view showing the lower portion of the baguette tray according to an embodiment of the present invention, and FIG. 5 is a cross-sectional view taken along lines (a) A-A', (b) B-B', and (c) C-C' of FIG. 3, respectively.

Referring to FIGS. 3 to 5, a baguette tray according to an embodiment of the present invention is a frame for making baguettes. A baguette tray 2 includes a body 21 where flour dough for making baguettes is placed, a pair of first sides 22 bending and extending from the left and right sides of the body 21 to be opposite to each other, and a pair of second sides 23 bending and extending from the front and rear of the body 21 and bending and extending from a side of each of the pair of first sides 22 to be opposite to each other, and the entire shape is a cube with the bottom open. Further, the baguette tray according to the present invention can be formed by pressing, such that it is possible to reduce the loss of manufacturing time and the material due to the machining.

The body 21, where flour dough is placed to make baguettes, is formed of a metallic plate having a predetermined shape, preferably, a rectangular shape, and supported by the pair of first sides 22 bending and extending from the left and right sides to be opposite to each other, and the pair of second sides 23 bending and extending from the front and rear of the body 21 and bending and extending from a side of each of the pair of first sides 22 to be opposite to each other. A plurality of holes may be formed through the body 21. The body 21 has a plurality of receiving portions 211 formed by partially bending the body 21 and boundaries 212 separating the receiving portions 211 as the plurality of receiving portions 211 are formed.

The receiving portions 211 are formed by bending the body 21 downward in a predetermined shape, preferably, to be recessed and rounded, in order to place flour dough for making baguettes, and the plurality of receiving portions 211 are arranged at regular intervals in parallel with the first sides 22. Protrusions 2111 which are bent may be formed at both ends of the receiving portion 211.

The protrusions 2111 obliquely bend upward at a predetermined angle, preferably, around 45° from the ends of the receiving portion 211 to be connected to the second sides 23, and for example, when four receiving portions 211 are formed on the body 21, as shown in FIG. 3, eight protrusions 2111 are formed. Since the protrusions 2111 are formed at the ends of the receiving portions 211, that is, the protrusions 2111 are formed at the joints of the receiving portions 211 and the second sides 23, the body 21 may be prevented from easily bending even if a force twisting or bending the body 21 up and down is applied, such that it is possible to improve durability of the baguette tray.

As the plurality of receiving portions 211 are formed, the boundaries 212 are formed between the receiving portions 211, such that it is possible to prevent contact between flour dough placed in the receiving portions 211 or baguettes made of the flour dough toasted in an oven. It is possible to improve convenience and safety for use by rounding the boundaries 212, preferably, upward without a sharp edge.

The first sides 22 is formed in a pair so as to bend and extend from the left and right sides of the body 21 to be opposite to each other, thereby supporting the body 21 and the second sides 23 to be described below are connected to a side of each of the first sides 22. The first sides 22 are formed by pressing the same material as the body 21. A curled portion 221 is formed at an end of the first side 22 by curling the end inward from the outside in a circular shape and the joint of the body 21 and the first side 22, that is, the portion where the first side 22 bends from the body 21 is rounded without a sharp edge to easily hold the baguette tray, such that it is possible to improve convenience and safety for use.

The second sides 23 bend and extend from the front and rear of the body 21 and are also formed in a pair so as to bend and extend from a side of each of the first sides 22 in a pair to be opposite to each other, thereby supporting the body 21. The second sides 23 are also formed by pressing the same material as the body 21 and the first sides 22. A curled portion 231 is formed at the end of the second side 23 by curling the end inward from the outside in a circular shape, and the joint of the body 21 and the second side 23, the joint of the first side 22 and the second side 23, and the joint of the body 21, the first side 22, and the second side 23 are rounded without a sharp edge, such that it is possible to improve convenience and safety in use. That is, the edge of the joint of at least two or more of the body 21, the first side 22, and the second side 23 is rounded without a sharp edge, such that it is possible to provide convenience in use and prevent a safety accident.

A baguette tray according to another embodiment of the present invention may further include protrusions 24 that protrude outward from the inside at the joint of the second sides 23 and the boundaries 212. Since the protrusions are formed at the joints of the boundaries 212 and the second sides 23, it is possible to prevent the body 21 from easily bending even if a force twisting or bending the body 21 up and down is applied, such that it is possible to improve durability of the baguette tray and it is possible to provide convenience in use and prevent a safety accident because there is no sharp edge.

Figure 6:
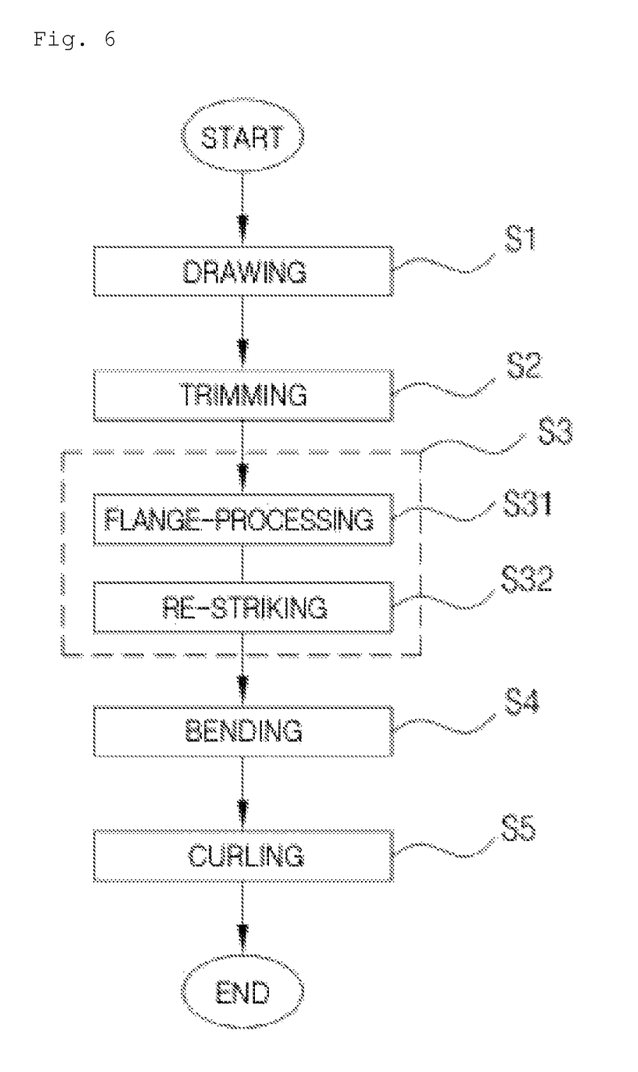
FIG. 6 is a flowchart illustrating a method of manufacturing a baguette tray, according to another embodiment of the present invention.
Figure 7:
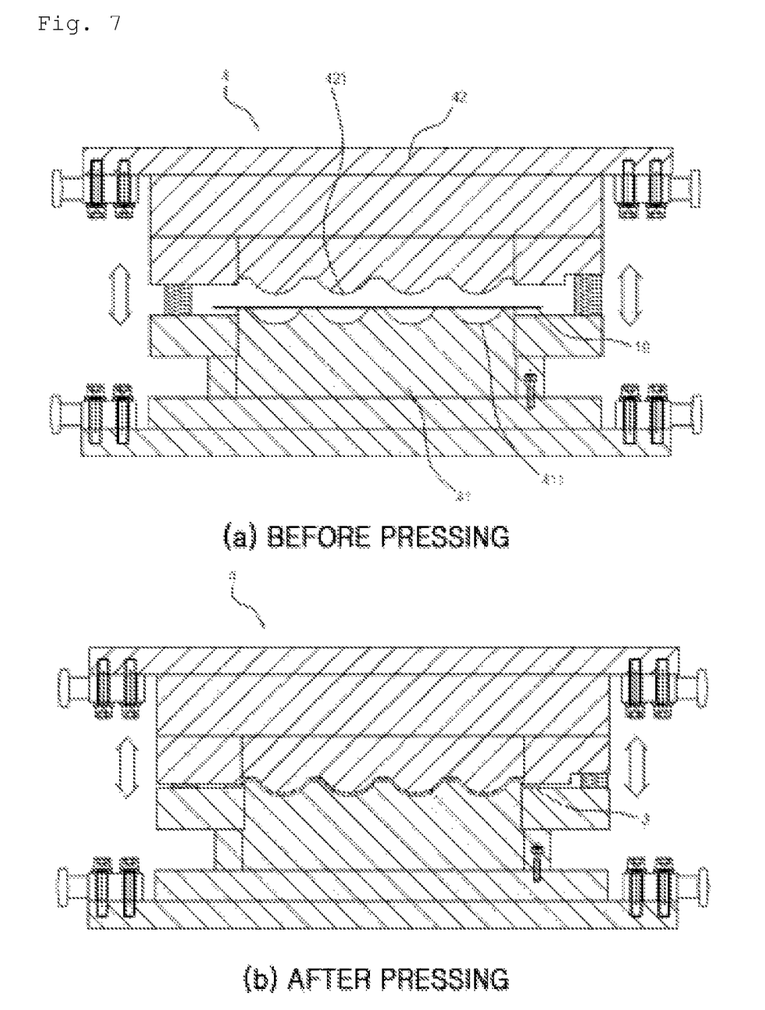
FIG. 7 is a cross-sectional view of a mold for illustrating drawing of the present invention.
Figure 8:
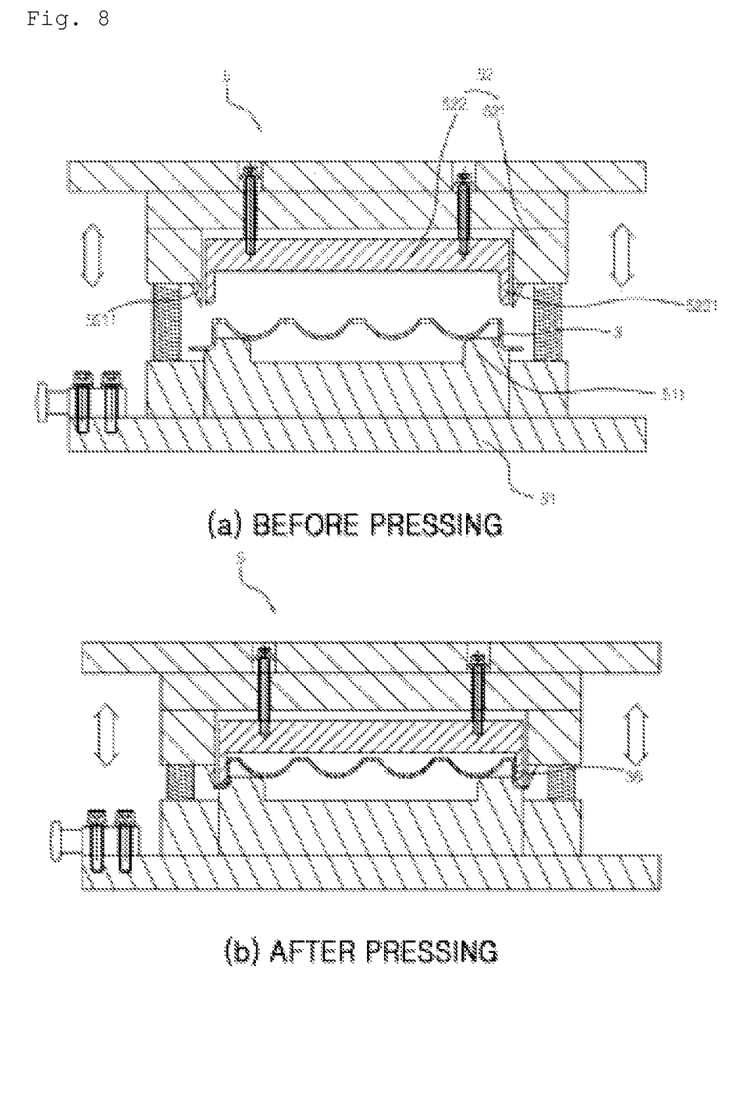
FIG. 8 is a cross-sectional view of a mold for illustrating trimming of the present invention.
Figure 9:
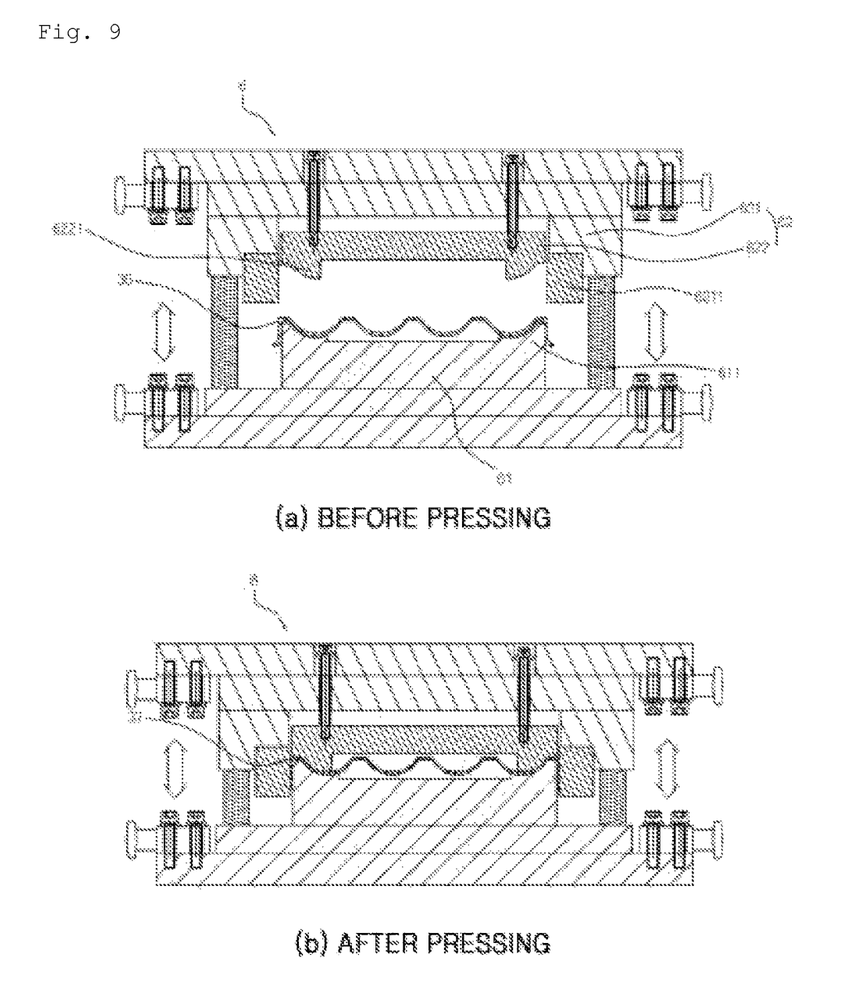
FIG. 9 is a cross-sectional view of a mold for illustrating flattening of the present invention.
Figure 10:
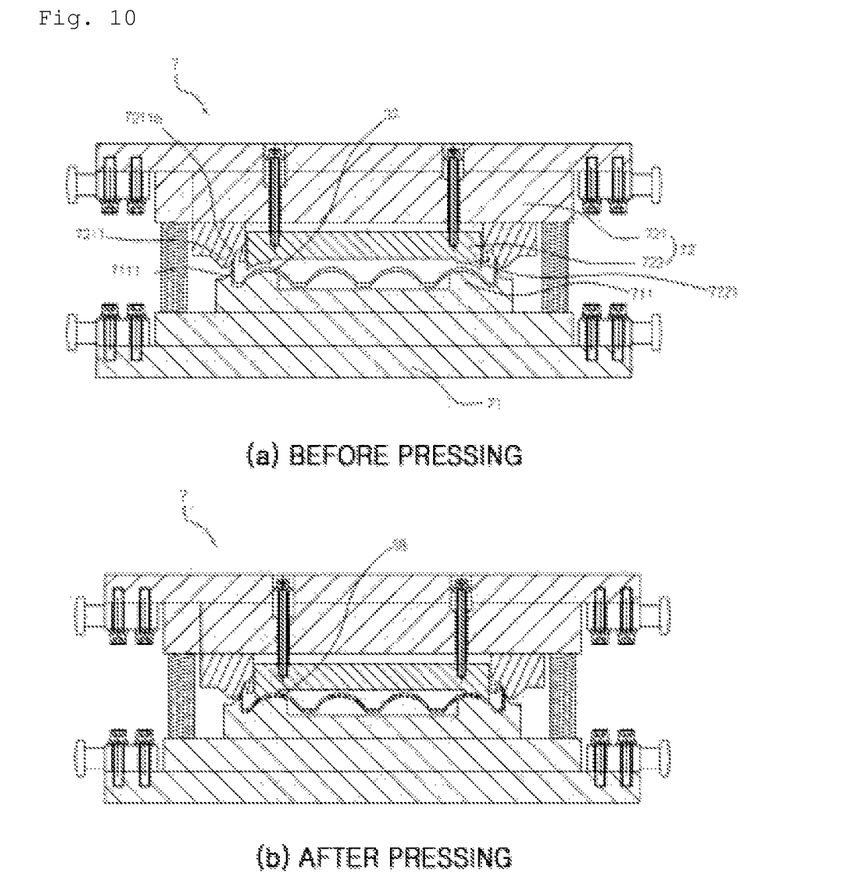
FIG. 10 is a cross-sectional view of a mold for illustrating bending of the present invention.
Figure 11:
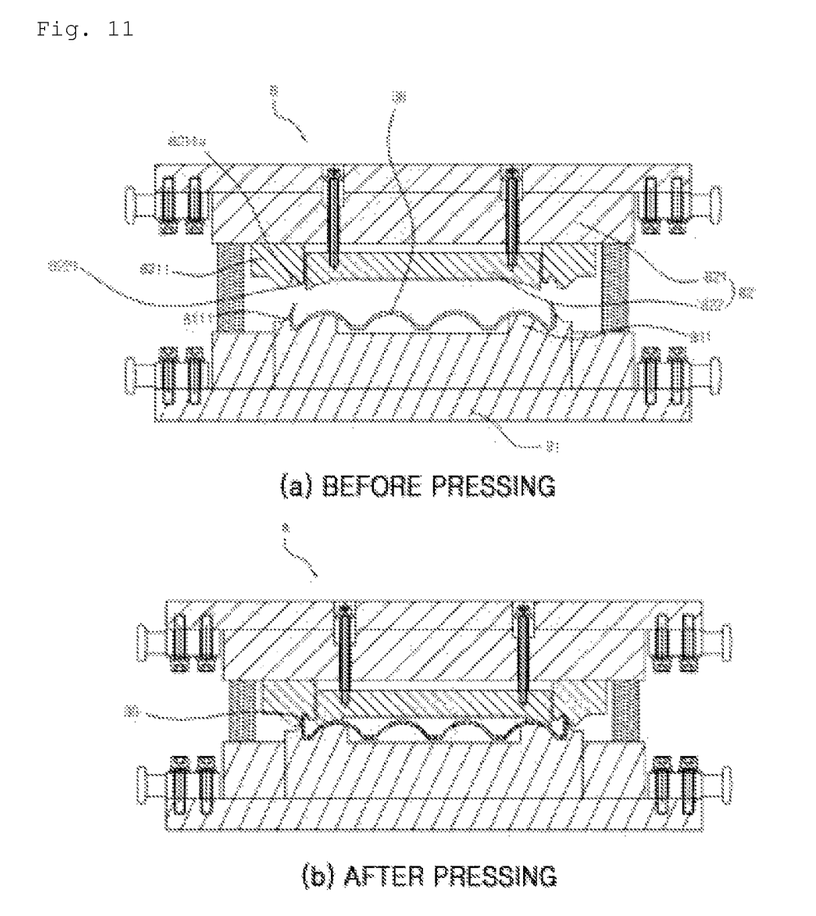
FIG. 11 is a cross-sectional view a mold for illustrating curling of the present invention.
Figure 12:
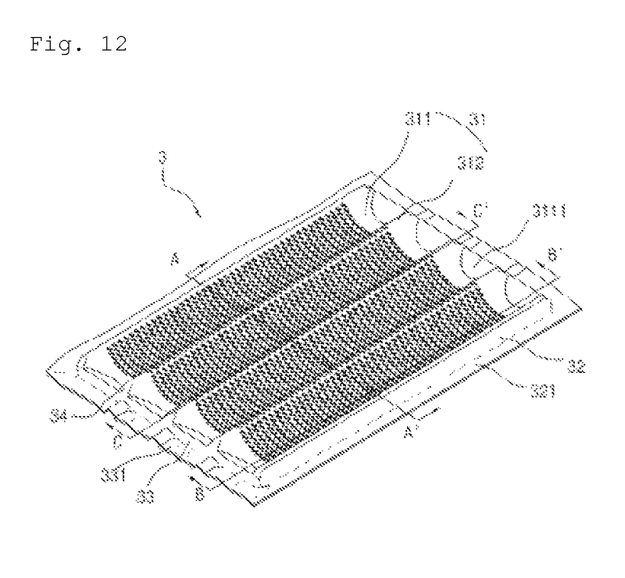
FIG. 12 is a perspective view of a baguette tray manufactured after the drawing of the present invention.
Figure 13:
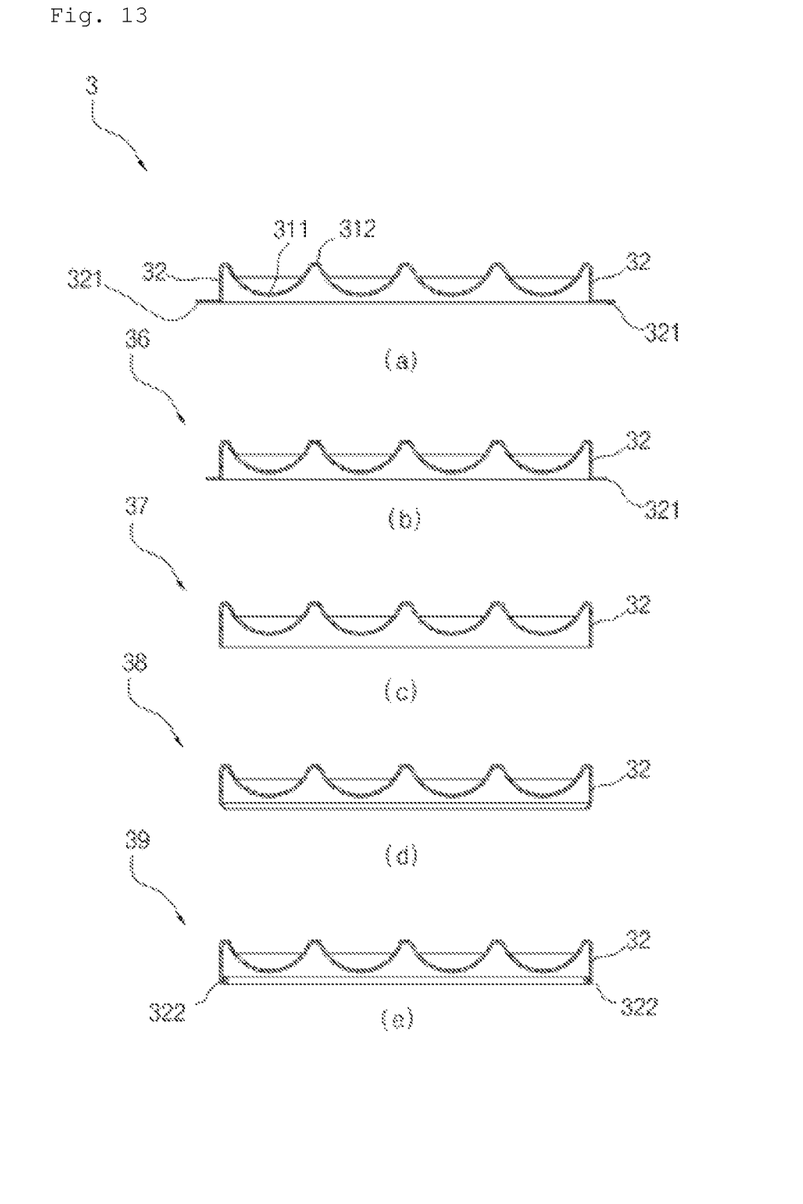
FIG. 13 is a cross-sectional view showing a deformation process of the cross-section taken along line A-A' of FIG. 12 after each process of the manufacturing method.
Figure 14:
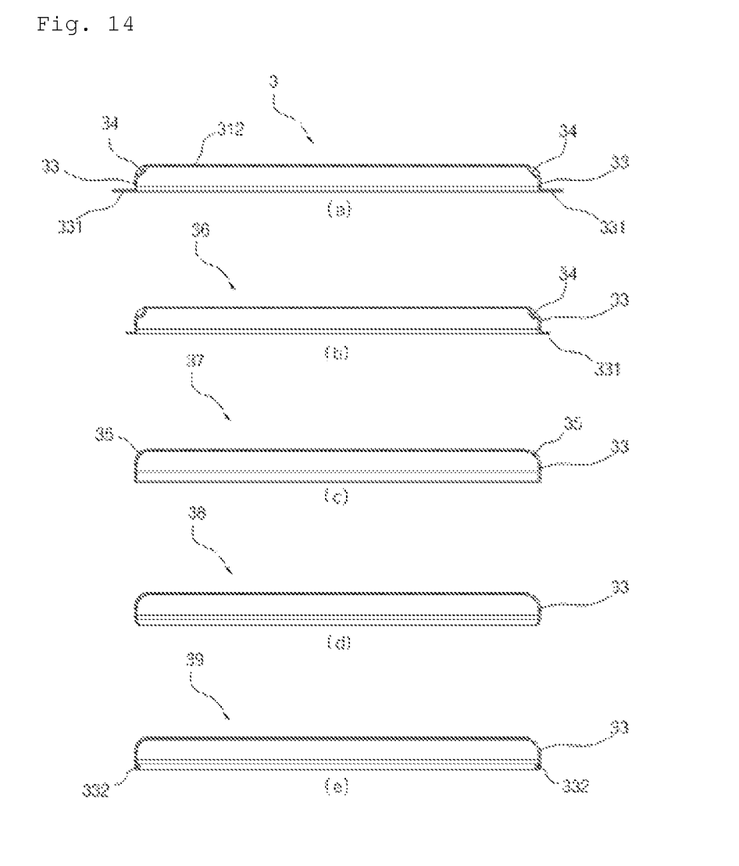
FIG. 14 is a cross-sectional view showing a deformation process of the cross-section taken along line B-B' of FIG. 12 after each process of the manufacturing method.
Figure 15:
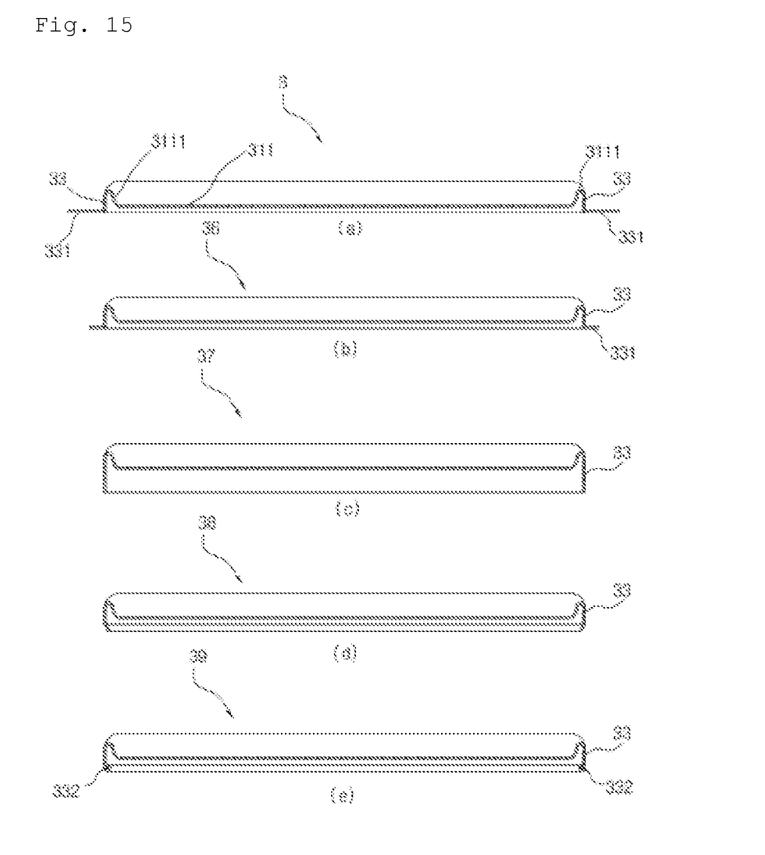
FIG. 15 is a cross-sectional view showing a deformation process of the cross-section taken along line C-C' of FIG. 12 after each process of the manufacturing method.

FIG. 6 is a flowchart illustrating a method of manufacturing a baguette tray, according to another embodiment of the present invention, FIG. 7 is a cross-sectional view of a mold for illustrating drawing of the present invention, FIG. 8 is a cross-sectional view of a mold for illustrating trimming of the present invention, FIG. 9 is a cross-sectional view of a mold for illustrating flattening of the present invention, FIG. 10 is a cross-sectional view of a mold for illustrating bending of the present invention, FIG. 11 is a cross-sectional view of a mold for illustrating curling of the present invention, FIG. 12 is a perspective view of a baguette tray manufactured after the drawing of the present invention, FIG. 13 is a cross-sectional view showing a deformation process of the cross-section taken along line A-A' of FIG. 12 after each process of the manufacturing method, FIG. 14 is a cross-sectional view showing a deformation process of the cross-section taken along line B-B' of FIG. 12 after each process of the manufacturing method, and FIG. 15 is a cross-sectional view showing a deformation process of the cross-section taken along line C-C' of FIG. 12 after each process of the manufacturing method.

A method of manufacturing a baguette tray according to another embodiment of the present invention will be described with reference to FIGS. 3 to 15. The method of manufacturing a baguette tray includes drawing (S1), trimming (S2), flattening (S3), and bending (S4) and a baguette tray can be manufactured by pressing with a mold in accordance with the manufacturing method, such that it is possible to reduce the loss of time and materials used for the manufacturing.

Drawing (S1) will be described with reference to FIGS. 6 and 7 and FIGS. 12 to 15. In the drawing (S1), a body 31, first sides 32, and second sides 33 are formed by pressing a metal plate 10 with a plurality of holes.

A drawing mold 4 used in the drawing (S1) will be described with reference to FIG. 7. The drawing mold 4 includes a lower holder 41 and an upper holder 42 disposed over the lower holder 41 to press the lower holder 41, in which the lower holder 41 includes on the top thereof a pad 411 shaped to correspond to the lower surface of the body 21 described with reference to FIG. 4 and the upper holder 42 includes on the bottom thereof a punch 421 shaped to correspond to the upper surface of the body 21 described with reference to FIG. 3.

In the drawing (S1), the rectangular metal plate 10 with the plurality of holes is placed on the pad 411 of the drawing mold 4 and is pressed by moving down the upper holder 42, such that a baguette tray 3 including the body 31, the first sides 32, and the second sides 33 is formed, as shown in FIGS. 12 and 13 to 15(a).

The baguette tray 3 formed after the drawing (S1) will be described. The baguette tray 3 includes the body 31, the pair of first sides 32 bending and extending from the left and right sides of the body 31 to be opposite to each other, and the pair of second sides 33 bending and extending from the front and rear of the body 31 and bending and extending from a side of each of the pair of first sides 32 to be opposite to each other. Further, the edge of the joint of two or more of the body 31, the first side 32, and the second side 33 is rounded. Since the body 31 is the same as the body 21 described with reference to FIGS. 3 to 5, the detailed description thereof will be omitted. Bending portions 321 and 331 are formed at the ends of the first side 32 and the second side 33 by bending the ends outward from the inside, respectively. The first sides 32 and the second sides 33 are wrinkled a lot after the drawing (S1) and partially uneven and a recession 34 that is recessed inward is formed at the joint of the second side 33 and the boundary 312 of the body 31.

The trimming (S2) is described with reference to FIGS. 6, 8, and 12 to 15. The trimming (S2) is a process of cutting the ends of the first sides 32 and the second sides 33, which are formed by pressing, with a predetermined length.

A trimming mold 5 used in the trimming (S2) will be described with reference to FIG. 8. The trimming mold 5 includes a lower holder 51 and an upper holder 52 that is disposed over the lower holder 51 to press the lower holder 51, in which the upper holder 52 includes an upper mold 521 and a lower mold 522 disposed under the upper mold 521 and having a circumference smaller than the upper mold 521, a cut portions 5211 is formed on the bottom of the upper mold 521 at a predetermined distance from the outer side of the lower mold 522, and an end protrusion 5221 coming in contact with the outer sides of the first sides 32 and the second sides 33 of the baguette tray 3 and pressing the tops of the bending portions 321 and 331 is formed on the outer side of the bottom of the lower mold 522 when the upper holder 52 presses the lower holder 51. A support 511 supporting the bottom of the baguette tray 3 formed after the drawing (S1) is formed on the top of the lower holder 51.

In the trimming (S2), when the baguette tray 3 shown in FIG. 12, which is formed after the drawing (S1), is placed on the support 511 of the trimming mold 5 and pressed by moving down the upper holder 52, the bending portions 321 and 331 of the baguette tray 3 are positioned between the support 511 and the end protrusion 5221, partially protruding outside. As the upper holder 52 moves down, the cutting portion 5211 on the bottom of the upper mold 521 moves down and cuts the protruding portions of the bending portions 321 and 331, such that, as shown in FIGS. 13 and 15(b), a baguette tray 36 with the bending portions 321 and 331 having the same predetermined length is formed.

The flattening (S3) will be described with reference to FIGS. 6, 9, and 13 to 15. The flattening (S3), a process of flattening the first sides 32 and the second sides 33, includes flange-processing (S31) that unbends the bending portions 321 and 331 cut to have a predetermined length to be aligned with the first sides 32 and the second sides 33 and removes the wrinkles and concavities and convexities on the first sides 32 and the second sides 33 and re-striking (S32) that forms a protrusion 35 by pushing the recession 34 formed at the joint of the second side 33 and the boundary 312 outward from the inside.

A flattening mold 6 used in the flattening (S3) will be described with reference to FIG. 9. The flattening mold 6 includes a lower holder 61 and an upper holder 62 disposed over the lower holder 61 to press the lower holder 61, in which the upper holder 62 includes an upper mold 621 and a lower mold 622 disposed under the upper mold 621 and having a circumference smaller than the upper mold 621, a lower step 6211 is formed on the bottom of the upper mold 621 at a predetermined distance from the outer side of the lower mold 622, and an end protrusion 6221 shaped to correspond to the upper surface of the body of the baguette tray 36 is formed at the outer side of the bottom of the lower mold 622. A support 611 supporting the bottom of the baguette tray 36 formed after the trimming (S2) is formed on the top of the lower holder 61.

In the flange-processing (S31), when the baguette tray 36 having the bending portions 321 and 331 cut to have a predetermined length is placed on the support 611 of the flattening mold 6 and pressed by moving down the upper holder 62, the baguette tray 36 is positioned between the support 611 and the end protrusion 6211 and the first sides 32, the second sides 33, and the bending portions 321 and 331 protrude outside. The tower step 6211 on the bottom of the upper mold 621 removes the wrinkles and concavities and convexities on the first sides 32 and the second sides 33 and unbends the bending portions 321 and 331 to be aligned with the first sides 32 and the second sides 33 while moving down, such that a baguette tray 37 with the first sides 32 and the second sides 33 flattened is formed, as shown in FIGS. 13 to 15(c).

In the re-striking (S32), similarly to the flange-processing (S31), when the baguette tray 36 having the bending portions 321 and 331 cut to have a predetermined length is placed on the support 611 of the flattening mold 6 and pressed by moving down the upper holder 62, the body of the baguette tray 36 is positioned between the support 611 and the end protrusion 6221 and the top of the support 611 pushes the recession 34 formed at the joint of the second side 33 and the boundary 312, such that the baguette tray 37 having the protrusion 35 is formed, as shown in FIG. 15(c).

Though separately described, the flange-processing and the re-striking are simultaneously performed by the flattening mold. Since the protrusion is formed by the flattening, it is possible to prevent deformation of the body, such that it is possible to improve durability of the baguette tray.

The bending (S4) will be described with reference to FIGS. 6, 10, and 13 to 15. The bending (S4) is a process of bending the ends of the first sides 32 and the second sides 33, which are flattened, inward from the outside.

A bending mold 7 used in the bending (S4) will be described with reference to FIG. 10. The bending mold 7 includes a lower holder 71 and an upper holder 72 disposed over the lower holder 71 to press the lower holder 71, in which the upper holder 72 includes an upper mold 721 and a lower mold 722 disposed under the upper mold 721 and having a circumference smaller than the upper mold 721, a lower step 7211 is formed on the bottom of the upper mold 721 at a predetermined distance from the outer side of the lower mod 722, and a groove 7221a receiving a protrusion 7111 of a support 711, which is described below, is formed on the bottom of the lower step 7211. The groove 7221a is shaped to be inclined upward and inward from the outside. An end protrusion 7221 shaped to correspond to the bottom of the body of the baguette tray 37 is formed at the outer side of the bottom of the lower mold 722. The support 711 supporting the top of the baguette tray 37 with the first sides 32 and the second side 33 flattened is formed on the top of the lower holder 71. The protrusion 7111 inclined upward and inward from the outside is formed at the outer side of the top of the support 711.

In the bending (S4), when the baguette tray 37 with the first sides 32 and the second sides 33 flattened is placed with the top in contact with the top of the support 711 and pressed by moving down the upper holder 72, the body of the baguette tray 37 is fixed between the support 711 and the end protrusion 7221, the ends of the first sides 32 and the second sides 33 are positioned in the groove 7211 and bent along the surface inclined inward from the outside toward the upper portion of the groove 7211, such that a baguette tray 38 with the ends of the first sides 32 and the second sides 33 bent inward from the outside is formed, as shown in FIGS. 13 to 15(d).

A method of manufacturing a baguette tray according to another embodiment of the present invention may further include curling (S5) of forming curled portions 322 and 332 by circularly curling the ends of the first sides 32 and the second sides 33, which are bent inward. Since the curled portions 322 and 332 are formed at the ends of the first sides 32 and the second sides 33 by the curling (S5), a sharp portion can be removed, such that it is possible to improve convenience and safety in use of the baguette tray.

Hereafter, the curling (S5) will be described with reference to FIGS. 6, 11, and 13 to 15. A bending mold 8 used in the curling (S5) will be described with reference to FIG. 11. The curling mold 8 includes a lower holder 81 and an upper holder 82 disposed over the lower holder 81 to press the lower holder 81, in which the upper holder 82 includes an upper mold 821 and a lower mold 822 disposed under the upper mold 821 and having a circumference smaller than the upper mold 821, a lower step 8211 is formed on the bottom of the upper mold 821 at a predetermined distance from the outer side of the lower mold 822, and a semicircular groove 8211a recessed upward and receiving a protrusion 8111 of a support 811, which is described below, is formed on the bottom of the lower step 8211. An end protrusion 8221 shaped to correspond to the lower surface of the body of the baguette tray 38 is formed on the outer side of the bottom of the lower mold 822. The support 811 supporting the upper surface of the baguette tray 38 with the ends of the first sides 32 and the second sides 33 bent inward is formed on the top of the lower holder 81. The protrusion 8111 inclined upward and inward from the outside is formed at the outer side of the top of the support 811.

In the curling (S5), when the baguette tray 38 with the ends of the first sides 32 and the second sides 33 bent inward is placed with the top in contact with the top of the support 811 and pressed by moving down the upper holder 82, the body of the baguette tray 38 is positioned and fixed between the support 811 and the end protrusion 8221 and the ends of the first sides 32 and the second sides 33 are positioned in the groove 8211a and bent along the curved surface of the groove 8211a, such that a baguette tray 39 with the ends of the first sides 32 and the second sides 33 circularly curled inward from the outside to form the curled portions 322 and 332 is formed, as shown in FIGS. 13 to 15(e). That is, the baguette tray 2 described with reference to FIGS. 3 to 5 is manufactured.

Since the baguette tray according to the present invention is manufactured by a mold, it is possible to reduce the labor the cost of the material for manufacturing and to manufacture products with a high quality and the same standard in a large quantity. Further, since there is not sharp portion in the baguette tray according to the present invention, it is possible to provide convenience and safety in use.

Although the applicant(s) described preferred embodiments of the present invention above, it should be construed that the embodiments are just examples for implementing the spirit of the present invention and included in the present invention.

The invention claimed is:

1. A method of manufacturing a baguette tray, comprising: drawing that forms a body, first sides, and second sides by pressing a metal plate; trimming that cuts the ends of the pressed first sides and second sides with a predetermined length; flattening that flattens the first sides and the second sides of which the ends are cut with a predetermined length; and bending that bends inward the ends of the flattened first sides and second sides,
    wherein the flattening includes:
    flange-processing that unbends the bending portions to be aligned with the first sides and the second sides and removes wrinkles and concavities and convexities on the first sides; and
    re-striking that forms a protrusion by pushing a recession formed at the joint of the second side and the boundary outward from the inside.

2. The method of manufacturing a baguette tray according to claim 1, further comprising: curling that forms curled portions by circularly curling the ends of the first side and the second side which are bend inward.

3. The method of manufacturing a baguette tray according to claim 1, wherein, in the drawing a body, a pair of first sides bending and extending from the left and right sides of the body to be opposite to each other, and a pair of second sides bending and extending from the front and rear of the body and bending and extending from a side of each of the pair of first sides to be opposite to each other, are formed, a plurality of receiving portions formed in parallel with the first sides to receive flour dough and boundaries formed between the receiving portions are formed in the body, and bending portions that are bent outward from the inside are formed at the ends of the first side and the second side.

4. The method of manufacturing a baguette tray according to claim 1, wherein the trimming, the flattening, and the bending are performed by using a mold.

* * * * *